(12) United States Patent
Motoji et al.

(10) Patent No.: US 12,493,204 B2
(45) Date of Patent: Dec. 9, 2025

(54) OPTICAL INTEGRATED CIRCUIT

(71) Applicant: KYOCERA Corporation, Kyoto (JP)

(72) Inventors: Reona Motoji, Tokyo (JP); Tomoya Sugita, Machida (JP); Dan Maeda, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 18/862,054

(22) PCT Filed: May 21, 2024

(86) PCT No.: PCT/JP2024/018726
§ 371 (c)(1),
(2) Date: Oct. 31, 2024

(87) PCT Pub. No.: WO2025/083932
PCT Pub. Date: Apr. 24, 2025

(65) Prior Publication Data
US 2025/0130450 A1 Apr. 24, 2025

Related U.S. Application Data

(63) Continuation-in-part of application No. PCT/JP2023/037751, filed on Oct. 18, 2023.

(51) Int. Cl.
G02F 1/095 (2006.01)
(52) U.S. Cl.
CPC ................... G02F 1/0955 (2013.01)
(58) Field of Classification Search
None
See application file for complete search history.

(56) References Cited

U.S. PATENT DOCUMENTS 6,943,422 B2 9/2005 Yasuoka et al.
7,507,600 B2 3/2009 Yasuoka et al.
(Continued)

FOREIGN PATENT DOCUMENTS

EP 2746839 A1 6/2014
JP H02-281777 A 11/1990
(Continued)

OTHER PUBLICATIONS

Translation of WO2015/024161A1 (Year: 2015).*
(Continued)

Primary Examiner — Chad H Smith
(74) Attorney, Agent, or Firm — Procopio, Cory, Hargreaves & Savitch LLP

(57) ABSTRACT

An optical integrated circuit includes: a waveguide including a first part and a second part and configured to couple an electromagnetic wave propagating in the first part and an electromagnetic wave propagating in the second part; and a non-reciprocal member positioned alongside the second part in an amplitude direction of an electric field component of the electromagnetic wave. In a range where the first part and the second part are coupled with each other, deviation between a center of an energy distribution of an electric field component of the electromagnetic wave propagating in the first part and a center of an energy distribution of an electric field component of the electromagnetic wave propagating in the second part falls within a prescribed range.

10 Claims, 13 Drawing Sheets

(56) References Cited

U.S. PATENT DOCUMENTS

| | | | |
|---|---|---|---|
| 7,664,346 B2 | 2/2010 | Mizumoto et al. | |
| 9,647,425 B1 | 5/2017 | Nakamura | |
| 2017/0102565 A1* | 4/2017 | Kim | G02B 6/2766 |
| 2021/0349191 A1 | 11/2021 | Bi et al. | |
| 2023/0288633 A1 | 9/2023 | Sugita et al. | |

FOREIGN PATENT DOCUMENTS

| | | | |
|---|---|---|---|
| JP | H5-341231 A | 12/1993 | |
| JP | 2004-54135 A | 2/2004 | |
| JP | 2015-169833 A | 9/2015 | |
| JP | 2017-117944 A | 6/2017 | |
| JP | 2020-134845 A | 8/2020 | |
| JP | 2023-131665 A | 9/2023 | |
| WO | 2007/083419 A1 | 7/2007 | |
| WO | WO-2015024161 A1 * | 2/2015 | G02F 1/0955 |

OTHER PUBLICATIONS

Written Opinion of the International Searching Authority for the corresponding PCT application No. PCT/JP2024/018726, dated Jul. 9, 2024, 12 pages.

\* cited by examiner

OPTICAL INTEGRATED CIRCUIT

TECHNICAL FIELD

The present disclosure relates to an optical integrated circuit.

BACKGROUND OF INVENTION

A known optical isolator employs the magneto-optical material Ce:YIG as a waveguide layer as described in Patent Literature 1.

CITATION LIST

Patent Literature

Patent Literature 1: International Publication No. 2007/083419

SUMMARY

In an embodiment of the present disclosure, an optical integrated circuit includes a waveguide and a non-reciprocal member. The waveguide includes a first part and a second part. The waveguide is configured so that an electromagnetic wave propagating in the first part and an electromagnetic wave propagating in the second part couple with each other. The non-reciprocal member is positioned alongside the second part in an amplitude direction of an electric field component of the electromagnetic wave. In a range where the first part and the second part are coupled with each other, deviation between a center of an energy distribution of an electric field component of the electromagnetic wave propagating in the first part and a center of an energy distribution of an electric field component of the electromagnetic wave propagating in the second part falls within a prescribed range.

DESCRIPTION OF EMBODIMENTS (Example Configuration of Optical Integrated Circuit 1)

Figure 1A:
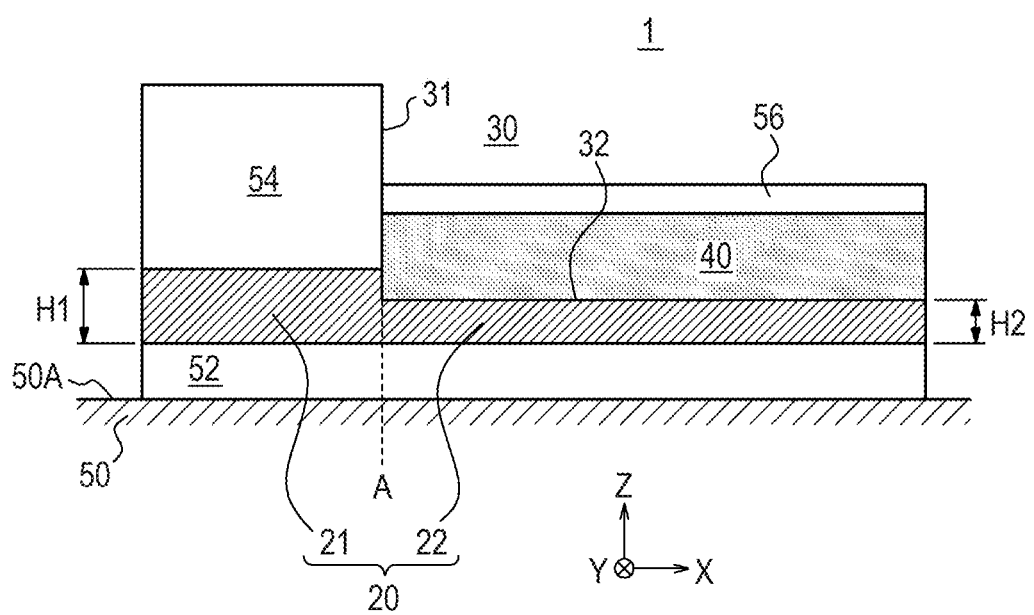
FIG. 1A is a diagram illustrating an example configuration of an optical integrated circuit according to an embodiment in a cross section taken along an extension direction of a waveguide.
Figure 1B:
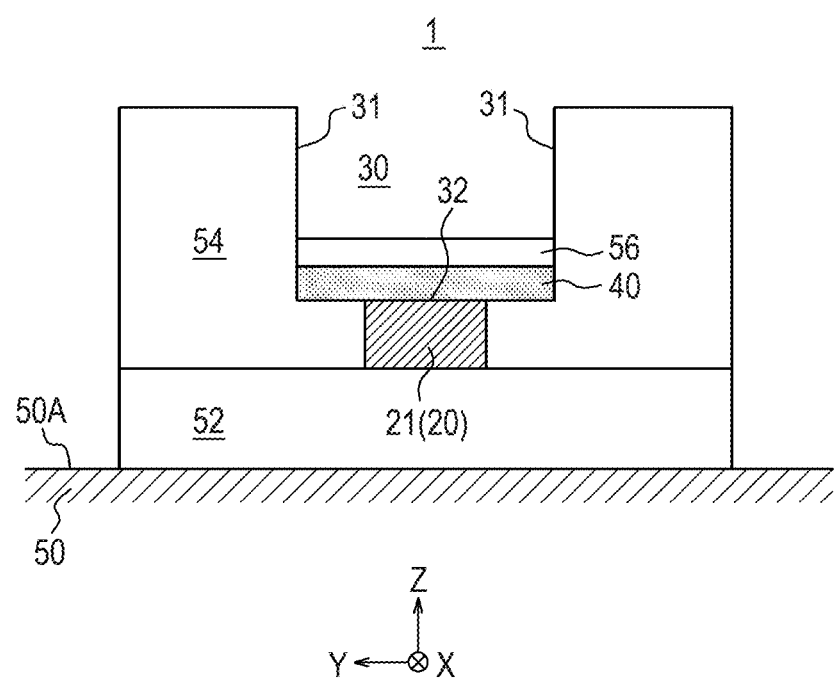
FIG. 1B is a diagram illustrating an example configuration of the optical integrated circuit according to an embodiment in a cross section perpendicular to the extension direction of the waveguide.

As illustrated in FIGS. 1A and 1B, in an embodiment, an optical integrated circuit 1 includes a substrate 50, a box layer 52, insulating layers 54 and 56, a waveguide 20, and a non-reciprocal member 40. The substrate 50 has a substrate surface 50A. The box layer 52 is positioned on the substrate surface 50A. The waveguide 20 is positioned on the box layer 52. The waveguide 20 extends in the horizontal direction of the sheet, i.e. in the X-axis direction.

The insulating layer 54 is positioned on the box layer 52 and the waveguide 20. The insulating layer 54 includes a recess 30 that is demarcated by a side surface 31 and a bottom surface 32. The recess 30 extends along the waveguide 20, i.e., along the X-axis direction. The recess 30 may be formed by etching the insulating layer 54, for example. In FIG. 1B, part of the bottom surface 32 of the recess 30 includes the top surface of the waveguide 20.

The waveguide 20 includes a first part 21 and a second part 22. The first part 21 of the waveguide 20 corresponds to a part of the waveguide 20 that extends without overlapping the recess 30 of the insulating layer 54 in plan view of the substrate 50. The second part 22 of the waveguide 20 corresponds to a part of the waveguide 20 that extends and overlaps the recess 30 of the insulating layer 54 in plan view of the substrate 50.

The non-reciprocal member 40 is positioned on the bottom surface 32 inside the recess 30. In other words, the non-reciprocal member 40 is in contact with the top surface of the second part 22 of the waveguide 20. In addition, the non-reciprocal member 40 extends along the waveguide 20, i.e., along the X-axis direction. The insulating layer 56 is positioned on the non-reciprocal member 40. The optical integrated circuit 1 does not need to include the insulating layer 56.

The substrate 50 may contain a conductor such as a metal, a semiconductor such as silicon, or glass or resin. In this embodiment, the substrate 50 is assumed to be composed of silicon (Si), but is not limited to this material and may be composed of various other materials.

The waveguide 20 is surrounded by the box layer 52 and the insulating layer 54. The waveguide 20 is also referred to as the core. The box layer 52 and the insulating layer 54 are also referred to as cladding. The core and the cladding may include a dielectric. The waveguide 20 is also referred to as a dielectric line. The waveguide 20, which serves as a core, is positioned along the substrate surface 50A and causes electromagnetic waves to propagate along the substrate surface 50A. In other words, the electromagnetic waves propagate inside the waveguide 20, serving as a core, in the direction in which the waveguide 20 extends.

The materials of the core and the cladding are selected so that the relative dielectric constant of the core is greater than that of the cladding. In other words, the materials of the core and the cladding are selected so that the refractive index of the cladding is lower than that of the core. Consequently, electromagnetic waves propagating in the core can undergo total reflection at the boundary with the cladding. As a result, loss of electromagnetic waves propagating through the core can be reduced.

The relative dielectric constants of the core and the cladding may be greater than that of air. By making the relative dielectric constants of the core and the cladding greater than that of air, leaking of electromagnetic waves from the optical integrated circuit 1 can be suppressed. As a result, loss resulting from electromagnetic waves being radiated to the outside from the optical integrated circuit 1 can be reduced.

In this embodiment, the material of the waveguide 20, serving as a core, is assumed to be silicon (Si), but is not limited to this material and may be various other materials. The materials of the box layer 52 and the insulating layer 54, serving as cladding, are assumed to be quartz glass or a silicon oxide film ($SiO_2$), but are not limited to these materials and may be various other materials. The relative dielectric constants of silicon and quartz glass are approximately 12 and 2, respectively. Silicon can transmit electromagnetic waves having a near-infrared wavelength of approximately 1.2 µm to approximately 6 µm with low loss. When the waveguide 20 is composed of silicon, the waveguide 20 can cause electromagnetic waves having a wavelength in a 1.3 µm band or a 1.55 µm band used in optical communications to propagate with low loss.

The non-reciprocal member 40 generates non-reciprocity in the propagation characteristics of electromagnetic waves in the waveguide 20, which is positioned alongside the non-reciprocal member 40. Non-reciprocity is a property in which the phase difference when electromagnetic waves propagate in a first direction through the waveguide 20 is different from the phase difference when electromagnetic waves propagate in a second direction through the waveguide 20. For example, the first direction corresponds to a positive X-axis direction in FIG. 1A. In this case, the second direction corresponds to a negative X-axis direction in FIG. 1A.

In the waveguide 20, the transmission characteristics of the electromagnetic waves in the second part 22, alongside which the non-reciprocal member 40 is disposed, are different from the transmission characteristics of the electromagnetic waves in the first part 21, alongside which the non-reciprocal member 40 is not disposed, with respect to the point that non-reciprocity occurs.

In this embodiment, Ce:YIG (cerium-substituted yttrium iron garnet) is used as the material for the non-reciprocal member 40. As the material for the non-reciprocal member 40, a transparent magnetic material such as partially substituted YIG material, such as Bi: YIG (bismuth-substituted YIG), may be used. As the material for the non-reciprocal member 40, a ferromagnetic material such as FeCo, FeNi, or CoPt, or a substance containing a ferromagnetic material, etc., may be used. As the material for the non-reciprocal member 40, a dielectric composite composed of magnetic nanoparticles, for example, a nanogranular material, may be used. In addition to these materials, various other magnetic materials may be used as the non-reciprocal member 40. The non-reciprocal member 40 is formed by depositing a film on the substrate 50 with the recess 30 having been formed in the insulating layer 54.

Hereafter, an embodiment in which TM-mode electromagnetic waves propagate through the waveguide 20 illustrated in FIGS. 1A and 1B will be described. TM-mode electromagnetic waves are electromagnetic waves whose electric field amplitude direction is aligned with a direction normal to the substrate surface 50A when the electromagnetic waves propagate along the substrate surface 50A of the substrate 50. In the waveguide 20 illustrated in FIGS. 1A and 1B, when TM-mode electromagnetic waves propagate in the X-axis direction, the amplitude direction of the electric field is aligned with the Z-axis direction.

The intensity of the electromagnetic waves corresponds to the magnitude of the energy of the electric field component of the electromagnetic waves. The intensity of the electromagnetic waves decreases with increasing distance from the surface of the waveguide 20 outside the waveguide 20. The intensity of the TM-mode electromagnetic waves outside the waveguide 20 decreases in accordance with a Gaussian distribution. As a propagation characteristic of the TM-mode electromagnetic waves in the waveguide 20, a Z-axis-direction, which is the amplitude direction of the electric field of the TM-mode electromagnetic waves, mode field diameter (MFD) is defined. The Z-axis-direction mode field diameter is defined as the distance between two positions where the intensity of the electromagnetic waves propagating in the waveguide 20 decreases to $1/e^2$ of the maximum intensity of the electromagnetic waves. In other words, the Z-axis-direction mode field diameter is defined as the length of the range in which the electromagnetic wave intensity is greater than or equal to $1/e^2$ of the maximum intensity. Here, e is a value representing the base of the natural logarithm, or Napier's number.

The energy of electromagnetic waves is effectively distributed over the range in which the intensity of the electromagnetic waves is greater than or equal to $1/e^2$ of the maximum intensity. In other words, the mode field diameter corresponds to the length of the range over which the energy of the electromagnetic waves is effectively distributed. In addition, the range of the mode field diameter corresponds to the range over which the energy of the electromagnetic waves is effectively distributed. The range of the Z-axis-direction mode field diameter corresponds to the range over which the energy of the electromagnetic waves propagating in the waveguide 20 is effectively distributed in the Z-axis direction.

The Z-axis-direction mode field diameter is determined based on the dimension of the waveguide 20 in a direction along the substrate surface 50A in a cross-section perpendicular to the extension direction of the waveguide 20, i.e., the width of the waveguide 20, and the dimension of the waveguide 20 in a direction normal to the substrate surface 50A of the waveguide 20, i.e., the height of the waveguide 20. In addition, the Z-axis-direction mode field diameter is determined based on the refractive index of the waveguide 20, the refractive indices of the box layer 52 and the insulating layer 54 positioned around the waveguide 20, and the wavelength of the electromagnetic waves propagating in the waveguide 20.

The Z-axis-direction mode field diameter is affected by the non-reciprocal member 40 positioned along the waveguide 20. Specifically, non-reciprocity appears in the propagation characteristics of the waveguide 20 due to the non-reciprocal member 40 being positioned within the range of the Z-axis-direction mode field diameter of the waveguide 20. In other words, non-reciprocity appears in the propagation characteristics of the waveguide 20 due to the non-reciprocal member 40 being positioned alongside the waveguide 20 in the amplitude direction of the electric field of the electromagnetic waves, i.e., alongside the waveguide 20 in the Z-axis direction.

In addition, the range of the Z-axis-direction mode field diameter of the waveguide 20 expands toward the side where the non-reciprocal member 40 is positioned. The range of the Z-axis-direction mode field diameter of the waveguide 20 expands towards the non-reciprocal member 40, and this results in the center position of the range of the Z-axis-direction mode field diameter of the waveguide 20 moving in a direction toward the non-reciprocal member 40. The center position of the range of the mode field diameter is also referred to as a mode center.

Figure 2:
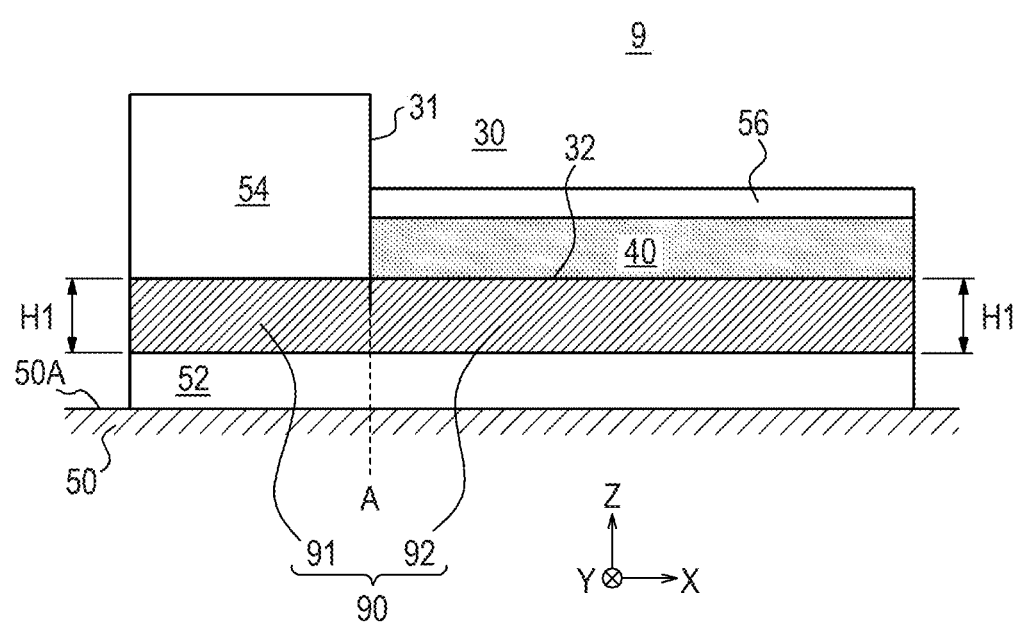
FIG. 2 is a cross-sectional view illustrating the configuration of an optical integrated circuit according to a Comparative Example.

Here, the effect of the non-reciprocal member 40 on the position of the mode center of the waveguide 20 will be described while referring to an optical integrated circuit 9 according to a Comparative Example illustrated in FIG. 2.

The optical integrated circuit 9 according to the Comparative Example is obtained by replacing the waveguide 20 in the optical integrated circuit 1 in FIG. 1A with a waveguide 90. The waveguide 90 includes a first part 91 and a second part 92. In the cross-section perpendicular to the extension direction of the waveguide 90, the shape of the first part 91 of the waveguide 90 is the same as the shape of the second part 92. The optical integrated circuit 9 includes a non-reciprocal member 40 positioned along the second part 92 of the waveguide 90.

Let us suppose that, in the optical integrated circuit 9, the non-reciprocal member 40 is not positioned along the second part 92 of the waveguide 90. In this case, since the cross-sectional shape of the first part 91 of the waveguide 90 is the same as the cross-sectional shape of the second part 92 of the waveguide 90, the propagation characteristics of electromagnetic waves in the first part 91 of the waveguide 90 are the same as the propagation characteristics of the electromagnetic waves in the second part 92 of the waveguide 90. In other words, at the part where the first part 91 and the second part 92 of the waveguide 90 are connected to each other, i.e., the part indicated by a broken line (A) in FIG. 2, the mode center of the first part 91 of the waveguide 90 and the mode center of the second part 92 of the waveguide 90 coincide with each other. When the propagation characteristics of electromagnetic waves in the first part 91 of the waveguide 90 and the propagation characteristics of electromagnetic waves in the second part 92 of the waveguide 90 are identical, there will be no loss when electromagnetic waves propagate from the first part 91 to the second part 92 of the waveguide 90, or when electromagnetic waves propagate from the second part 92 to the first part 91 of the waveguide 90.

However, in the optical integrated circuit 9 according to the Comparative Example, the non-reciprocal member 40 is positioned along the second part 92 of the waveguide 90. Due to the presence of the non-reciprocal member 40, the mode center of the second part 92 of the waveguide 90 is moved in the direction toward the non-reciprocal member 40 relative to the mode center of the first part 91 of the waveguide 90. As a result, the mode centers are shifted from each other at the part where the first part 91 and the second part 92 of the waveguide 90 are connected to each other, i.e., the part indicated by the broken line (A) in FIG. 2. Due to the mode center of the first part 91 of the waveguide 90 and the mode center of the second part 92 of the waveguide 90 being shifted with respect to each other, loss when electromagnetic waves propagate from the first part 91 to the second part 92 of the waveguide 90 or loss when the electromagnetic waves propagate from the second part 92 to the first part 91 of the waveguide 90 is increased.

In other words, the shift of the mode centers causes the propagation characteristics of electromagnetic waves in the first part 91 of the waveguide 90 to be mismatched with the propagation characteristics of electromagnetic waves in the second part 92 of the waveguide 90. The mismatch in the propagation characteristics of the electromagnetic waves is also referred to as a mode mismatch. Due to the mode mismatch occurring at the part where the first part 91 and the second part 92 of the waveguide 90 are connected to each other, loss when electromagnetic waves propagate from the first part 91 to the second part 92 of the waveguide 90 or loss when electromagnetic waves propagate from the second part 92 to the first part 91 of the waveguide 90 is increased.

On the other hand, in the optical integrated circuit 1 according to this embodiment, the first part 21 and the second part 22 have different shapes from each other in a cross section perpendicular to the extension direction of the waveguide 20. Specifically, the height of the bottom surface of the first part 21 of the waveguide 20 is the same as the height of the bottom surface of the second part 22, and the top surface of the second part 22 of the waveguide 20 is lower than the top surface of the first part 21 of the waveguide 20. In other words, when the dimension in a direction normal to the substrate surface 50A of the first part 21 of the waveguide 20 is expressed as H1, and the dimension in a direction normal to the substrate surface 50A of the second part 22 of the waveguide 20 is expressed as H2, H2<H1 holds true.

When the non-reciprocal member 40 is positioned on the top surface side of the second part 22 of the waveguide 20, i.e. in the positive Z-axis direction, the mode center of the second part 22 is moved in the direction toward the non-reciprocal member 40, i.e. in the positive Z-axis direction. On the other hand, the top surface of the second part 22 of the waveguide 20 is lower than the top surface of the first part 21, and therefore the mode center of the second part 22 is moved in the negative Z-axis direction. In other words, the center position of the second part 22 of the waveguide 20 in the Z-axis direction is lower than the center position of the first part 21 in the Z-axis direction, and therefore the mode center of the second part 22 moves in the negative Z-axis direction.

The direction in which the mode center of the second part 22 is moved due to the non-reciprocal member 40 is opposite to the direction in which the mode center of the second part 22 is moved due to the position of the top surface of the second part 22 of the waveguide 20, and therefore the distance by which the mode center of the second part 22 moves in the Z-axis direction is shorter. Due to the distance by which the mode center of the second part 22 is moved being shorter, deviation in the Z-axis direction between the mode center of the first part 21 and the mode center of the second part 22 of the waveguide 20 is reduced at the part where the first part 21 and the second part 22 of the waveguide 20 are connected to each other, i.e., the part indicated by a broken line (A) in FIG. 1A. As a result, the loss when electromagnetic waves propagate from the first part 21 to the second part 22 of the waveguide 20 or the loss when electromagnetic waves propagate from the second part 22 to the first part 21 of the waveguide 20 in the optical integrated circuit 1 according to this embodiment is smaller than the loss when electromagnetic waves propagate from the first part 91 to the second part 92 of the waveguide 90 or the loss when electromagnetic waves propagate from the second part 92 to the first part 91 of the waveguide 90 in the optical integrated circuit 9 according to the Comparative Example.

Figure 3:
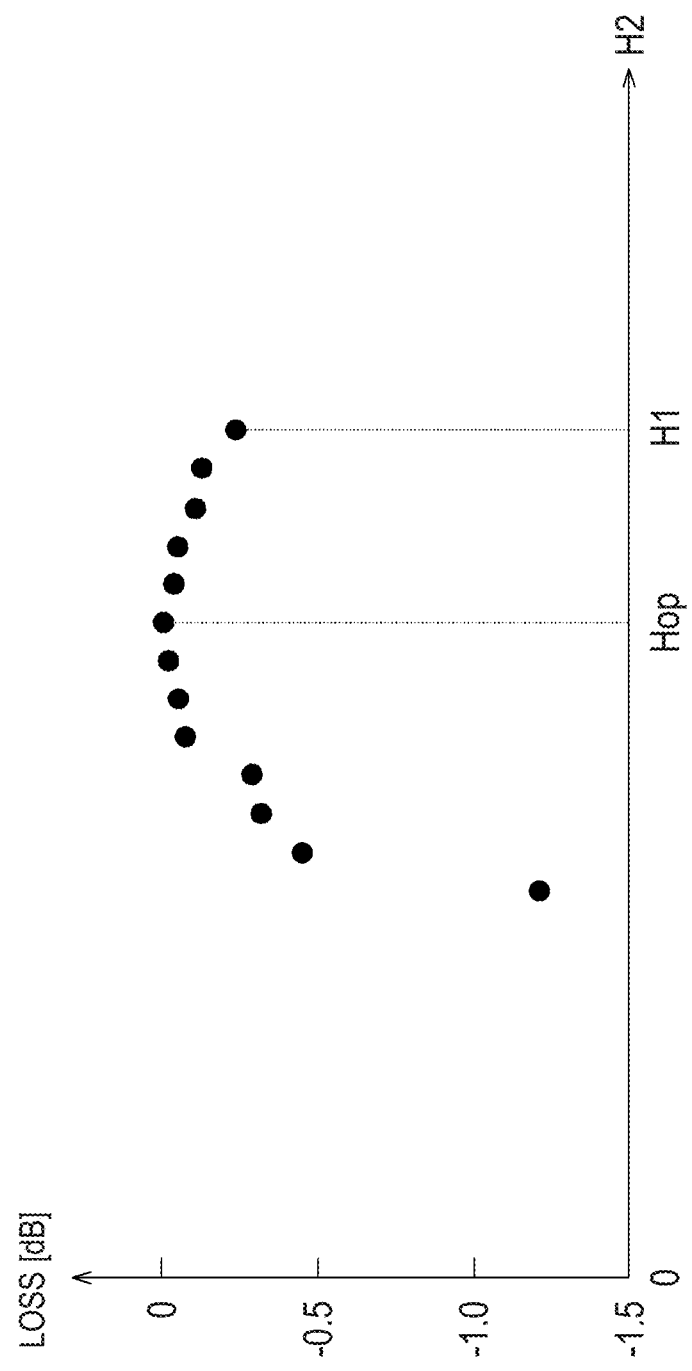
FIG. 3 is a graph illustrating the relationship between loss when electromagnetic waves propagate from a first part to a second part of a waveguide and the height of the second part of the waveguide.

As illustrated in FIG. 3 in the form of a graph, the loss when electromagnetic waves propagate from the first part 21 to the second part 22 of the waveguide 20 changes depending on changes in the height (H2) of the second part 22 of the waveguide 20. In the graph in FIG. 3, the horizontal axis represents the height (H2) of the second part 22 of the waveguide 20. The vertical axis represents the loss when the electromagnetic waves propagate from the first part 21 to the second part 22 of the waveguide 20. The units of loss are decibels (dB). Loss is expressed as a negative value. A larger loss is expressed as a smaller value.

When the height of the second part 22 of the waveguide 20 is made lower than H1, the loss is reduced compared to the case where the height of the second part 22 is the same as the height (H1) of the first part 21. The height of the second part 22 of the waveguide 20 at which the loss can be minimized is represented by Hop. When the height of the second part 22 of the waveguide 20 is made lower than Hop, the loss increases compared to the loss when the height of the second part 22 is Hop.

As described above, by making the height (H2) of the second part 22 of the waveguide 20 lower than the height (H1) of the first part 21 of the waveguide 20, the deviation of the mode center of the second part 22 from the mode center of the first part 21 is reduced. As a result, the loss when electromagnetic waves propagate from the first part 21 to the second part 22 of the waveguide 20 is reduced. In addition, since the propagation characteristics of the electromagnetic waves in the waveguide 20 are symmetrical, the loss when the electromagnetic waves propagate from the second part 22 to the first part 21 of the waveguide 20 is similarly reduced.

In addition, the height (H2) of the second part 22 of the waveguide 20 may be determined so that the loss when the height (H2) of the second part 22 of the waveguide 20 is made lower is not greater than the loss when H2=H1.

In other words, the optical integrated circuit 1 is configured such that the energy distribution of the electric field component of electromagnetic waves propagating in the first part 21 matches the energy distribution of the electric field component of electromagnetic waves propagating in the second part 22 in the range where the first part 21 and the second part 22 of the waveguide 20 are coupled with each other. The range where the first part 21 and the second part 22 are coupled with each other includes the part where the first part 21 and the second part 22 are coupled with each other. Matching the energy distributions means that the deviation between the mode center in the first part 21 and the mode center in the second part 22 lies within a prescribed range. The prescribed range is a range in which the loss when electromagnetic waves propagate from the first part 21 to the second part 22 or the loss when electromagnetic waves propagate from the second part 22 to the first part 21 is less than the loss when the cross-sectional shape of the first part 21 and the cross-sectional shape of the second part 22 are the same as each other.

<When TE-Mode Electromagnetic Waves Propagate>

The optical integrated circuit 1 according to the embodiment described above is configured so that the optical integrated circuit 1 can be used when TM-mode electromagnetic waves are made to propagate. In the present disclosure, the optical integrated circuit 1 may be configured so that the optical integrated circuit 1 can be used when TE-mode electromagnetic waves are made to propagate.

TE-mode electromagnetic waves are electromagnetic waves in which the amplitude direction of the electric field is perpendicular to propagation direction of the electromagnetic waves and coincides with a direction extending along the substrate surface 50A when the electromagnetic waves propagate along the substrate 50. When TE-mode electromagnetic waves propagate in the X-axis direction in the waveguide 20 illustrated in FIG. 1A, the amplitude direction of the electric field coincides with the Y-axis direction.

As a propagation characteristic of the TE-mode electromagnetic waves in the waveguide 20, a Y-axis-direction, which is the amplitude direction of the electric field of the TM-mode electromagnetic waves, mode field diameter (MFD) is defined. Similarly to the Z-axis-direction MFD of the TM-mode electromagnetic waves, the Y-axis-direction mode field diameter is defined as the distance between two positions where the intensity of the electromagnetic waves propagating in the waveguide 20 decreases to $1/e^2$ of the maximum intensity of the electromagnetic waves.

The Y-axis-direction mode field diameter is affected by the non-reciprocal member 40 positioned along the waveguide 20. Specifically, non-reciprocity appears in the propagation characteristics of the waveguide 20 due to the non-reciprocal member 40 being positioned within the range of the Y-axis-direction mode field diameter of the waveguide 20. In other words, non-reciprocity appears in the propagation characteristics of the waveguide 20 due to the non-reciprocal member 40 being positioned alongside the waveguide 20 in the amplitude direction of the electric field of the electromagnetic waves, i.e., alongside the waveguide 20 in the Y-axis direction.

In addition, the range of the Y-axis-direction mode field diameter of the waveguide 20 expands toward the side where the non-reciprocal member 40 is positioned. The range of the Y-axis-direction mode field diameter of the waveguide 20 expands towards the non-reciprocal member 40, and this results in the mode center in the Y-axis direction of the waveguide 20 moving in a direction toward the non-reciprocal member 40.

When the non-reciprocal member 40 is positioned alongside the second part 22 of the waveguide 20 in the Y-axis direction, the mode center in the Y-axis direction of the second part 22 is shifted in a direction toward the non-reciprocal member 40 with respect to the mode center in the Y-axis direction of the first part 21 of the waveguide 20. The loss when the electromagnetic waves propagate from the first part 21 to the second part 22 of the waveguide 20 or the loss when the electromagnetic waves propagate from the second part 22 to the first part 21 of the waveguide 20 increases due to the mode centers being shifted.

Accordingly, the second part 22 may be configured so that the center in the Y-axis direction of the second part 22 is shifted in a direction away from the non-reciprocal member 40. Specifically, the second part 22 may be configured so that the Y-axis-direction dimension of the second part 22, i.e., the width of the waveguide 20, becomes narrower in a direction away from the non-reciprocal member 40. In addition, the second part 22 may be positioned so as to be shifted in the Y-axis direction relative to the first part 21. In this way, the shift of the mode center of the second part 22 relative to the mode center of the first part 21 is reduced. As a result, the loss when the electromagnetic waves propagate from the first part 21 to the second part 22 of the waveguide 20 or the loss when the electromagnetic waves propagate from the second part 22 to the first part 21 of the waveguide 20 is decreased.

<Summary>

As described above, in the present disclosure, the optical integrated circuit 1 can reduce the loss when electromagnetic waves propagate from the first part 21 of the waveguide 20, where the non-reciprocal member 40 is not positioned, to the second part 22 of the waveguide 20, where the non-reciprocal member 40 is positioned, or the loss when electromagnetic waves propagate from the second part 22 to the first part 21, for both TM-mode and TE-mode electromagnetic waves.

In other words, in the present disclosure, the waveguide 20 of the optical integrated circuit 1 may be configured such that the dimension of the second part 22 is smaller than the dimension of the first part 21 in the amplitude direction of the electric field component of the electromagnetic waves in the range where the first part 21 and the second part 22 are coupled with each other. In addition, the waveguide 20 may be configured such that the center of the second part 22 in the amplitude direction of the electric field component of the electromagnetic waves is shifted in a direction away from the non-reciprocal member 40 relative to the center of the first part 21 in the range where the first part 21 and the second part 22 are coupled with each other.

OTHER EMBODIMENTS

Hereafter, other embodiments of the optical integrated circuit 1 will be described.

<Configuration in Which Insulating Layer 58 is Positioned Between Waveguide 20 and Non-Reciprocal Member 40>

Figure 4:
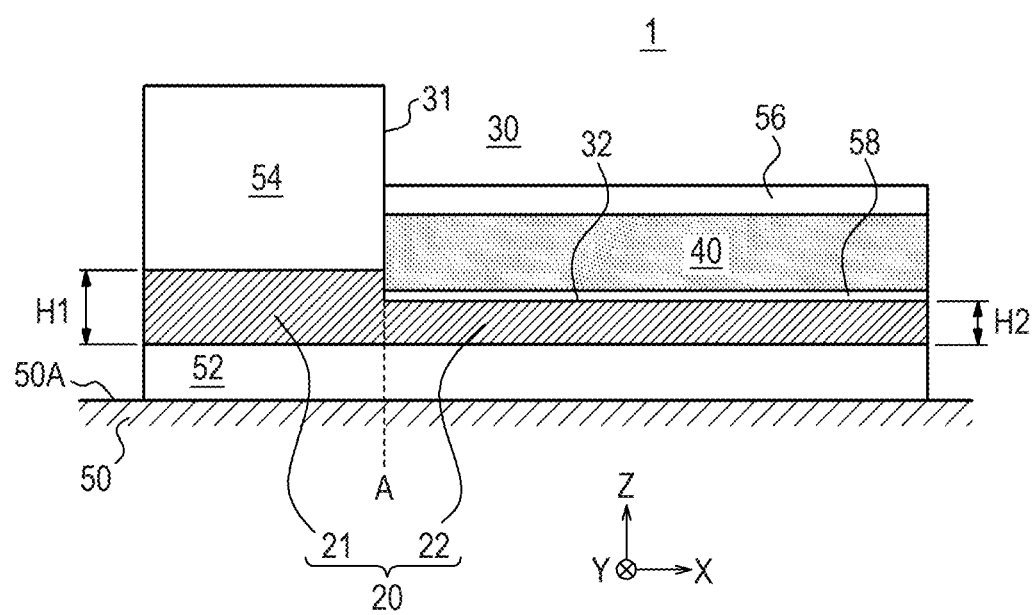
FIG. 4 is a diagram illustrating an example configuration of the optical integrated circuit in which an insulating layer is positioned between the waveguide and a non-reciprocal member, in a cross section along the extension direction of the waveguide.

As illustrated in FIG. 4, the optical integrated circuit 1 may further include an insulating layer 58 between the second part 22 of the waveguide 20 and the non-reciprocal member 40.

The distance between the second part 22 of the waveguide 20 and the non-reciprocal member 40 is determined in accordance with the thickness of the insulating layer 58. The thicker the insulating layer 58, the smaller the effect of the non-reciprocal member 40 on the second part 22 of the waveguide 20. The thicker the insulating layer 58, the shorter the distance that the mode center of the second part 22 of the waveguide 20 moves in a direction toward the non-reciprocal member 40. Therefore, the height (H2) of the second part 22 of the waveguide 20 may be set as appropriate in accordance with the thickness of the insulating layer 58.

<Configuration in Which Second Part 22 of Waveguide 20 Includes Sloping Portion 23>

Figure 5:
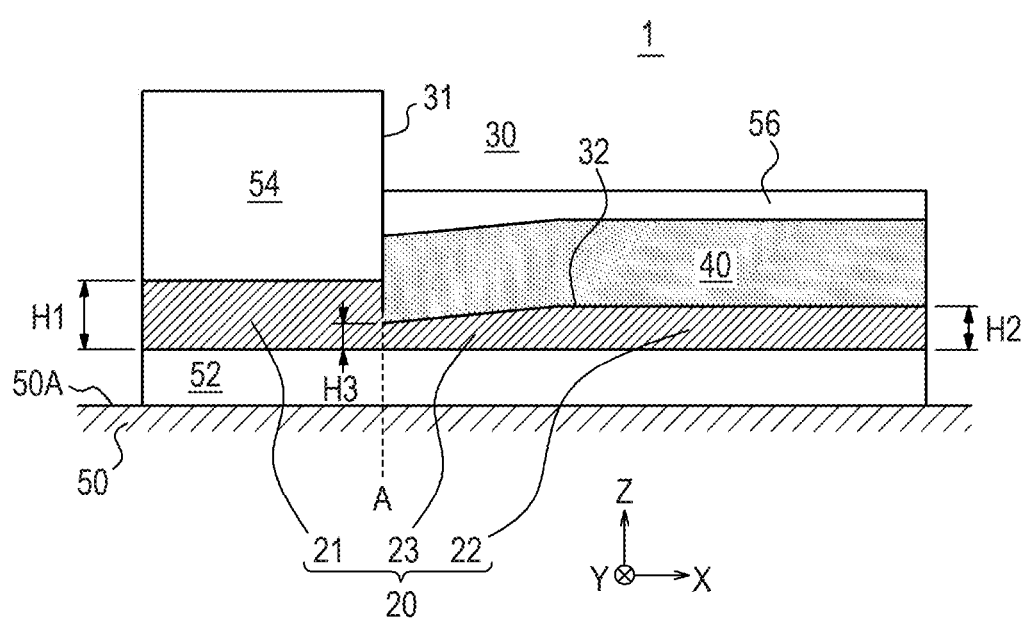
FIG. 5 is a diagram illustrating an example configuration of the optical integrated circuit including a sloping part where the waveguide increases in height from the first part to the second part, in a cross section along the extension direction of the waveguide.

As illustrated in FIG. 5, the waveguide 20 may further include a sloping portion 23, which is connected to the first part 21. The non-reciprocal member 40 is positioned not only on the second part 22 but also on the sloping portion 23. Therefore, the sloping portion 23 is included in the second part 22. The sloping portion 23 is lower than the first part 21 at the part connected to the first part 21. The sloping portion 23 is configured to become higher with increasing distance from the first part 21. In other words, the sloping portion 23 included in the second part 22 becomes larger in the direction toward the non-reciprocal member 40 with increasing distance from the first part 21.

In the part where the first part 21, where the non-reciprocal member 40 is not positioned, and the sloping portion 23, where the non-reciprocal member 40 is positioned, are connected to each other, i.e., the part indicated by a broken line (A) in FIG. 5, the height (H3) of the sloping portion 23 is set so that the deviation in the Z-axis direction between the mode center of the first part 21 of the waveguide 20 and the mode center of the sloping portion 23 of the waveguide 20 is reduced.

The loss when electromagnetic waves propagate through the waveguide 20 can be reduced by increasing the cross-sectional area of the waveguide 20. Therefore, as illustrated in FIG. 5, the waveguide 20 is configured so that the sloping portion 23 becomes higher from the part connected to the first part 21 toward the second part 22, and as a result, the cross-sectional area of the second part 22 of the waveguide 20 increases. The loss when electromagnetic waves propagate through the second part 22 is reduced as a result of the cross-sectional area of the second part 22 of the waveguide 20 being increased.

In addition, the mode center gradually moves in the Z-axis direction in the sloping portion 23. When the mode center gradually moves in the Z-axis direction, the loss of TM-mode electromagnetic waves is reduced compared to when the mode center moves in the Z-axis direction in a step-like manner. In other words, the smaller the amount of movement of the mode center in the Z-axis direction when TM-mode electromagnetic waves propagate for a unit length in the X-axis direction, the greater the degree to which the loss of the TM-mode electromagnetic waves is reduced. In other words, by connecting the first part 21 and the second part 22 via the sloping portion 23, the energy distributions are more easily matched.

The matching of the energy distributions in the sloping portion 23 may include a condition that the amount by which the mode center moves in the amplitude direction of the electric field component when electromagnetic waves propagate for a unit length in the sloping portion 23 is less than a prescribed threshold. The prescribed threshold may be set in accordance with an allowable value of loss of electromagnetic waves.

As a result, both the matching of the energy distributions at the part where the first part 21 of the waveguide 20, where the non-reciprocal member 40 is not positioned, and the second part 22 of the waveguide 20, where the non-reciprocal member 40 is positioned, are connected to each other, and the reduction of the loss when electromagnetic waves propagate through the second part 22, are achieved. The waveguide 20 may be configured so that the height (H2) of the second part 22 is lower than the height (H1) of the first part 21. In addition, the waveguide 20 may be configured so that the height (H2) of the second part 22 is the same as the height (H1) of the first part 21.

Figure 6:
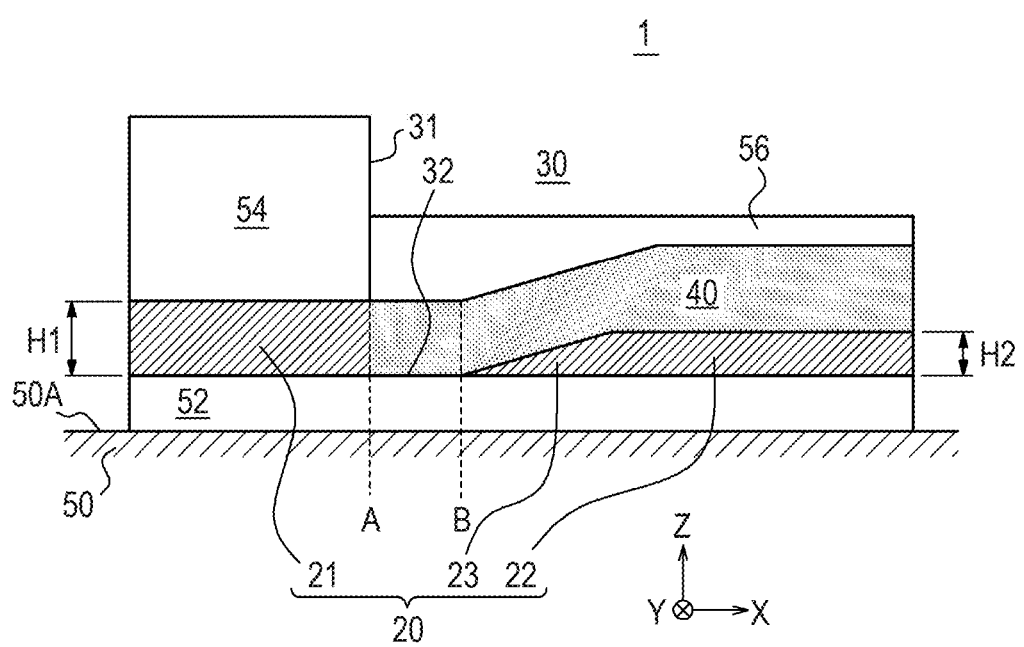
FIG. 6 is a diagram illustrating an example configuration of the optical integrated circuit in which the first part and the second part of the waveguide are separated from each other, in a cross section along the extension direction of the waveguide.

As illustrated in FIG. 6, the waveguide 20 may be configured such that the first part 21 and the second part 22 are positioned so as to be spaced apart from each other in the propagation direction of the electromagnetic waves, i.e., the X-axis direction. In other words, the waveguide 20 may be disconnected between the first part 21 and the second part 22. The second part 22 includes the sloping portion 23 as the end portion on the side close to the first part 21. The sloping portion 23 becomes lower in height with increasing proximity to the first part 21.

The non-reciprocal member 40 is positioned on the second part 22 of the waveguide 20, and is also positioned between the first part 21 and the second part 22 of the waveguide 20. When electromagnetic waves propagate through the non-reciprocal member 40, since the refractive index of the non-reciprocal member 40 is smaller than the refractive index of the waveguide 20, the mode field diameter in the non-reciprocal member 40, which is positioned in the disconnection part of the waveguide 20, is larger than the mode field diameter in the first part 21 of the waveguide 20. Therefore, in the part where the first part 21 of the waveguide 20 is connected to the disconnection part of the waveguide 20, i.e., the part indicated in FIG. 6 as a broken line (A), the energy distribution of the electromagnetic waves in the first part 21 of the waveguide 20 is easily matched with the energy distribution of the electromagnetic waves in the non-reciprocal member 40 positioned in the disconnection part of the waveguide 20.

In the part where the disconnection part of the waveguide 20 and the end portion of the sloping portion 23 of the waveguide 20 are connected to each other, i.e., the part indicated by a broken line (B) in FIG. 6, the mode center of the non-reciprocal member 40 coincides with the mode center at the end portion of the sloping portion 23. The sloping portion 23 increases in height with increasing distance from the first part 21, and the mode center gradually moves upwards. The energy distribution of the electromagnetic waves is easily matched between the disconnection part of the waveguide 20 and the sloping portion 23 of the waveguide 20 as a result of the mode center gradually moving. As a result, the loss when electromagnetic waves propagate from the first part 21 of the waveguide 20 through the disconnection part to the second part 22 including the sloping portion 23 of the waveguide 20, or the loss when electromagnetic waves propagate from the second part 22 through the disconnection part to the first part 21 is reduced.

As described above, the electromagnetic waves propagate from the first part 21 of the waveguide 20 to the second part 22 of the waveguide 20 through the non-reciprocal member 40, which is positioned in the disconnection part. In other words, the first part 21 and second part 22 of the waveguide 20 are optically coupled via the non-reciprocal member 40. The disconnection part of the waveguide 20 is included in the range where the first part 21 and the second part 22 of the waveguide 20 are coupled with each other.

The loss of electromagnetic waves in the non-reciprocal member 40 is greater than the loss of electromagnetic waves in the waveguide 20. Therefore, the shorter the disconnection part of the waveguide 20, the smaller the loss when the electromagnetic waves propagate from the first part 21 to the second part 22, or the loss when the electromagnetic waves propagate from the second part 22 to the first part 21. The length of the disconnection part of the waveguide 20 may be set as appropriate in accordance with the wavelength of the electromagnetic waves, etc.

Figure 7:
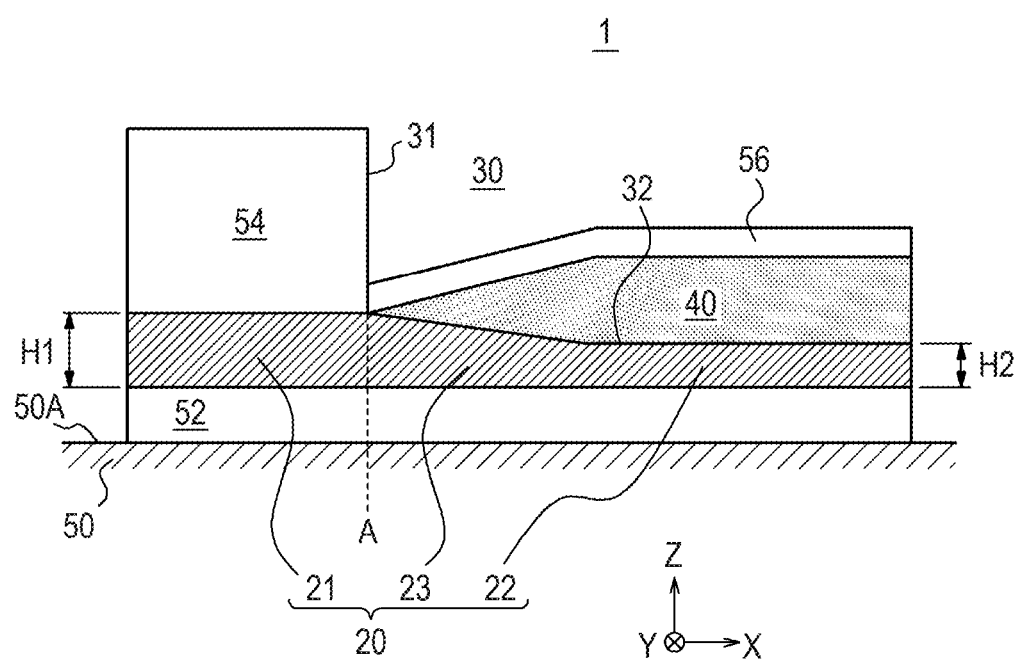
FIG. 7 is a diagram illustrating an example configuration of the optical integrated circuit including a sloping part where the waveguide decreases in height from the first part to the second part, in a cross section along the extension direction of the waveguide.

As illustrated in FIG. 7, the sloping portion 23 may be configured to have the same height as the first part 21 at the part of the sloping portion 23 connected to the first part 21, and to become lower with increasing distance from the first part 21. In other words, the sloping portion 23 included in the second part 22 decreases in size in the direction away from the non-reciprocal member 40 with increasing distance from the first part 21. In other words, the sloping portion 23 may become thinner with increasing distance from the first part 21. In addition, the non-reciprocal member 40 may become thinner on the sloping portion 23 with increasing proximity to the part connected to the first part 21. The non-reciprocal member 40 may be configured so that the thickness of the part connected to the first part 21 is 0. The non-reciprocal member 40 may become thinner with increasing proximity to the first part 21. Conversely, the non-reciprocal member 40 may become thicker with increasing distance from the first part 21.

In this case, the thickness of the non-reciprocal member 40 is 0 at the part where the first part 21 of the waveguide 20 and the sloping portion 23 of the waveguide 20 are connected to each other, i.e., the part indicated by a broken line (A) in FIG. 7, and consequently the mode center of the first part 21 and the mode center of the sloping portion 23 coincide with each other. Increasing the thickness of the non-reciprocal member 40 causes the mode center of the waveguide 20 to move in a direction away from the substrate surface 50A. Therefore, the non-reciprocal member 40 becomes thicker with increasing distance from the first part 21, and the mode center of the waveguide 20 gradually changes. In other words, the mode center of the waveguide 20 does not shift in the part where the first part 21 and the sloping portion 23 are connected to each other. As a result, the loss when electromagnetic waves propagate from the first part 21 to the second part 22 or the loss when electromagnetic waves propagate from the second part 22 to the first part 21 is smaller than the loss when the height of the first part 91 of the waveguide 90 and the height of the second part 92 of the waveguide 90 are the same as each other, as in the optical integrated circuit 9 according to the Comparative Example illustrated in FIG. 2. The sloping portion 23 is included in the range where the first part 21 and the second part 22 of the waveguide 20 are coupled with each other. In addition, making the sloping portion 23 thinner causes the mode center of the waveguide 20 to move in the direction toward the substrate surface 50A. In other words, the sloping portion 23 becoming thinner and the non-reciprocal member 40 becoming thicker result in the distance by which the mode center of the waveguide 20 moves becoming smaller. As a result, the loss when the electromagnetic waves propagate from the first part 21 to the second part 22 or the loss when the electromagnetic waves propagate from the second part 22 to the first part 21 becomes smaller.

<Example Configuration for Reducing Propagation Loss of TE-Mode Electromagnetic Waves>

In the embodiment described above, an example configuration was described in which the loss when TM-mode electromagnetic waves propagate between the part of the waveguide that does not exhibit non-reciprocity, i.e. the first part, and the part that does exhibit non-reciprocity, i.e. the second part, is reduced. Hereafter, an example configuration that reduces the loss when TE-mode electromagnetic waves propagate between the first part and the second part of the waveguide will be described with comparison to a Comparative Example.

Figure 8A:
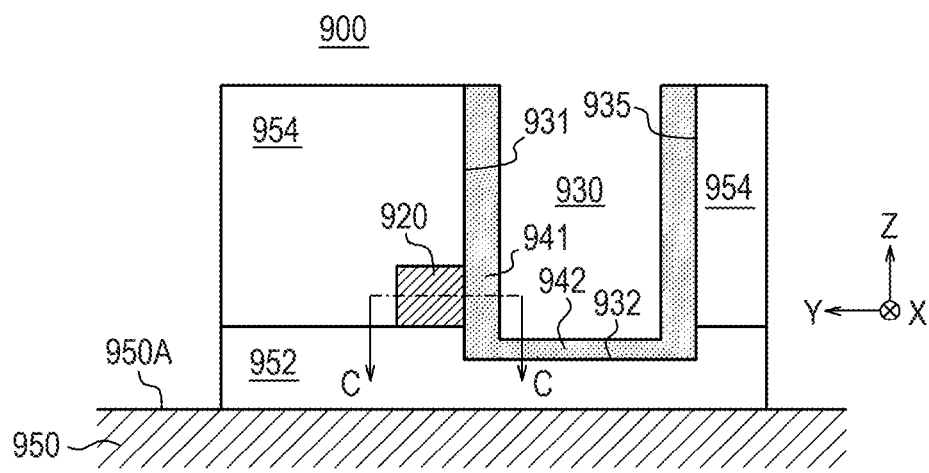
FIG. 8A is a diagram illustrating the configuration of an optical integrated circuit according to a Comparative Example in which TE-mode electromagnetic waves are made to propagate.
Figure 8B:
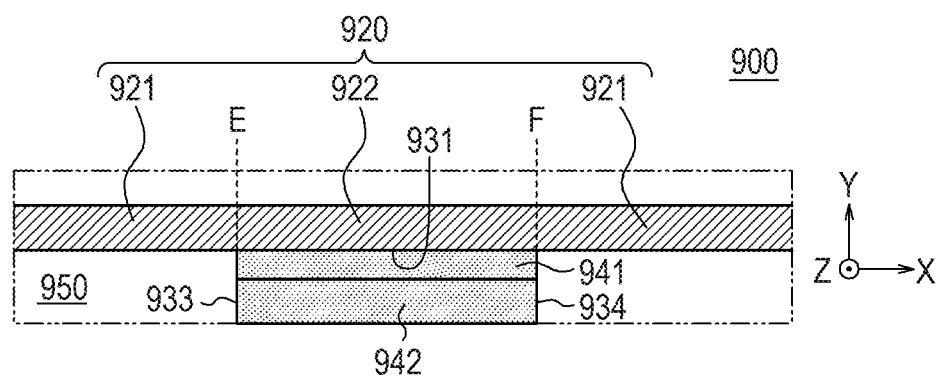
FIG. 8B is a cross-sectional view of the optical integrated circuit in FIG. 8A taken along C-C.

As a Comparative Example, FIGS. 8A and 8B illustrate an optical integrated circuit 900 in which TE-mode electromagnetic waves are made to propagate. The optical integrated circuit 900 includes a substrate 950, a box layer 952, an insulating layer 954, a waveguide 920, and non-reciprocal members 941 and 942. The substrate 950 may be composed of the same or a similar material to the substrate 50. The box layer 952 may be composed of the same or a similar material to the box layer 52. The insulating layer 954 may be composed of the same or a similar material to the insulating layer 54. The waveguide 920 may be composed of the same or a similar material to the waveguide 20. The non-reciprocal members 941 and 942 may be composed of the same or a similar material to the non-reciprocal member 40.

The substrate 950 has a substrate surface 950A. The box layer 952 is positioned on the substrate surface 950A. The waveguide 920 is positioned on the box layer 952 and extends along the substrate surface 950A. In FIGS. 8A and 8B, the coordinate system is set so that the direction in which a waveguide 920 extends is the X-axis direction. The insulating layer 954 is positioned on the box layer 952 and the waveguide 920.

A recess 930 is positioned within the insulating layer 954 and the box layer 952, and is demarcated by side surfaces 931, 933, 934, and 935, and a bottom surface 932. The recess 930 has a rectangular shape with a long axis in the X-axis direction in plan view of the substrate 950. The side surfaces 931 and 935 correspond to the long sides of the recess 930 and extend in the X-axis direction along the waveguide 920. The side surface 931 is positioned on the side near the waveguide 920. The waveguide 920 may be exposed from insulating layer 954 at the side surface 931, or may be covered by the insulating layer 954. The side surface 935 is positioned on the side far from the waveguide 920. The side surfaces 933 and 934 correspond to the short sides of the recess 930. The recess 930 may be formed by etching the insulating layer 954 and the box layer 952.

The non-reciprocal member 941 is positioned along the side surface 931 inside the recess 930. The non-reciprocal member 942 is positioned along the bottom surface 932 inside the recess 930. The non-reciprocal members 941 and 942 may be formed in the recess 930 by performing film deposition such as sputtering. In the deposition of the film into the recess 930, the material of the non-reciprocal members 941 and 942 may also be deposited on the side surface 933, 934, or 935.

Figure 9A:
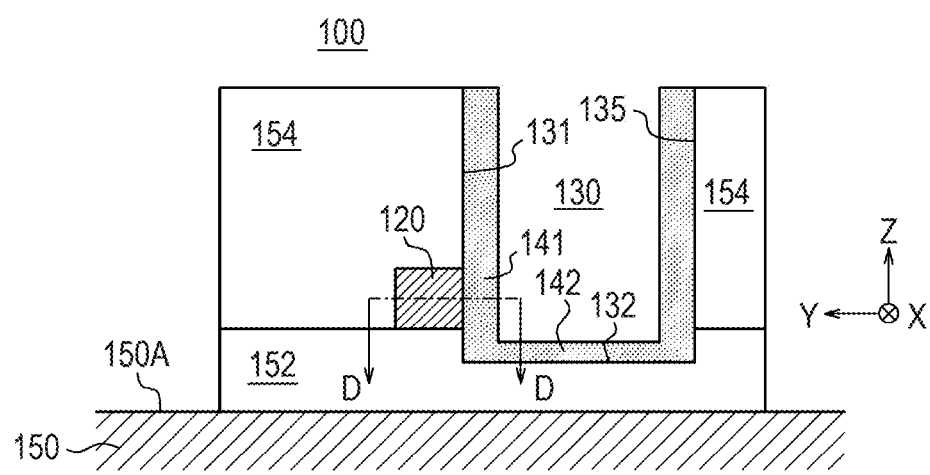
FIG. 9A is a diagram illustrating an example configuration of an optical integrated circuit according to an Example of the present disclosure in which TE-mode electromagnetic waves are made to propagate.
Figure 9B:
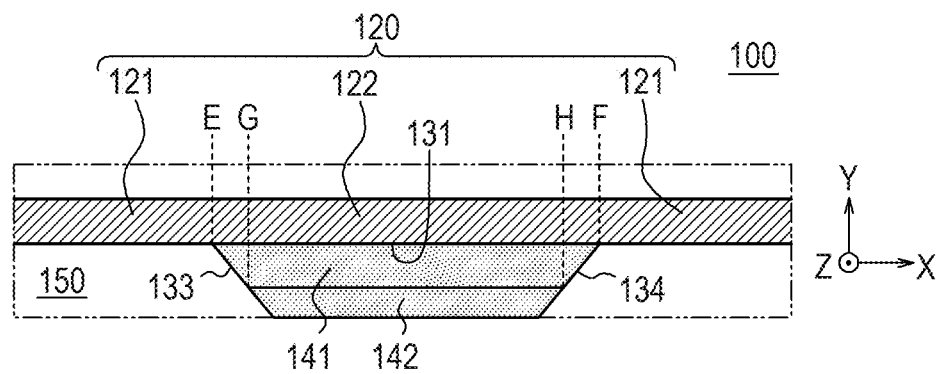
FIG. 9B is a cross-sectional view taken along D-D in FIG. 9A.

As an Example according to the present disclosure, an optical integrated circuit 100 in which TE-mode electromagnetic waves are made to propagate is illustrated in FIGS. 9A and 9B. The optical integrated circuit 100 includes a substrate 150, a box layer 152, an insulating layer 154, a waveguide 120, and non-reciprocal members 141 and 142. The substrate 150 may be composed of the same or a similar material to the substrate 50. The box layer 152 may be composed of the same or a similar material to the box layer 52. The insulating layer 154 may be composed of the same or a similar material to the insulating layer 54. The waveguide 120 may be composed of the same or a similar material to the waveguide 20. The non-reciprocal members 141 and 142 may be composed of the same or a similar material to the non-reciprocal member 40.

The substrate 150 has a substrate surface 150A. The box layer 152 is positioned on the substrate surface 150A. The waveguide 120 is positioned on the box layer 152 and extends along the substrate surface 150A. In FIGS. 9A and 9B, the coordinate system is set so that the direction in which the waveguide 120 extends is the X-axis direction. The insulating layer 154 is positioned on the box layer 152 and the waveguide 120.

A recess 130 is positioned within the insulating layer 154 and the box layer 152, and is demarcated by side surfaces 131, 133, 134, and 135, and a bottom surface 132. The recess 130 has a quadrilateral shape that includes two parallel sides that extend in the X-axis direction along the waveguide 120 and two sides that are different from the two parallel sides that extend in the X-axis direction, in plan view of the substrate 150. The side surface 131 corresponds to one side positioned on the side near the waveguide 120 out of the two sides extending in the X-axis direction. The waveguide 120 may be exposed from insulating layer 154 at the side surface 131, or may be covered by the insulating layer 154. The side surface 135 corresponds to one side positioned on the side far from the waveguide 120 out of the two sides extending in the X-axis direction. The side surfaces 133 and 134 correspond to the two sides that are different from the two parallel sides. The side surfaces 133 and 134 intersect at an angle of less than 90 degrees with respect to the side surface 131 in plan view of the substrate 150. In other words, the recess 130 is configured so that the interior angle between the side surface 131 and each of the side surfaces 133 and 134 is an acute angle when the substrate 150 is viewed in plan view. The recess 130 may be formed by etching the insulating layer 154 and the box layer 152.

The non-reciprocal member 141 is positioned along the side surface 131 inside the recess 130. The non-reciprocal member 142 is positioned along the bottom surface 132 inside the recess 130. The non-reciprocal members 141 and 142 may be formed in the recess 130 by performing film deposition such as sputtering. In the deposition of the film into the recess 130, the materials of the non-reciprocal members 141 and 142 may also be deposited on the side surface 133, 134, or 135.

In both this Example and the Comparative Example, the amplitude direction of the electric field of TE-mode electromagnetic waves propagating in the X-axis direction inside the waveguides 120 and 920 coincides with the Y-axis direction. The Y-axis-direction mode field diameter (MFD) of TE-mode electromagnetic waves is defined the same as the Z-axis-direction MFD of TM-mode electromagnetic waves. In other words, the Y-axis-direction MFD of the TE mode electromagnetic waves is defined as the distance between two positions where the intensity of the electromagnetic waves propagating in waveguide 20 decreases to $1/e^2$ of the maximum intensity of the electromagnetic waves.

The non-reciprocity for TE-mode electromagnetic waves is expressed as a result of the non-reciprocal member being positioned within the range of the MFD of the TE-mode electromagnetic waves. In this Example, the recess 130 is configured so that the non-reciprocal member 141, which is positioned along the side surface 131, is positioned within the range of the MFD of the TE-mode electromagnetic waves propagating in the waveguide 120, and the film, which is positioned along the side surface 135, is positioned outside the range of the MFD. In addition, the non-reciprocal member 142, which is positioned along the bottom surface 132 of the recess 130, is offset in the Z-axis direction with respect to the waveguide 120, and is located outside the range of the MFD of the TE-mode electromagnetic waves propagating in the waveguide 120. As a result, in this Example, the non-reciprocal member 141 generates non-reciprocity for the TE-mode electromagnetic waves propagating in the waveguide 120. On the other hand, in this Example, the non-reciprocal member 142 is assumed to not generate non-reciprocity with respect to the TE-mode electromagnetic waves propagating in the waveguide 120. In addition, in the Comparative Example, the non-reciprocal member 941 generates non-reciprocity with respect to the TE-mode electromagnetic waves propagating in the waveguide 920. On the other hand, the non-reciprocal member 942 is assumed to not generate non-reciprocity with respect to the TE-mode electromagnetic waves propagating in the waveguide 920.

In this Example, non-reciprocity occurs in the part of the waveguide 120 where the non-reciprocal member 141 is positioned along the waveguide 120. The part where the non-reciprocal member 141 is positioned along the waveguide 120 is the part where the non-reciprocal member 141 is positioned within the range of the MFD of the TE-mode electromagnetic waves propagating in the waveguide 120. The waveguide 120 is divided into a part where the non-reciprocal member 141 is positioned and parts where the non-reciprocal member 141 is not positioned. The parts of the waveguide 120 where the non-reciprocal member 141 is not positioned are referred to as first parts 121. The part where the non-reciprocal member 141 is positioned is referred to as a second part 122. The boundaries between the first parts 121 and the second part 122 correspond to the positions of the end portions, in the X-axis direction, of the non-reciprocal member 141, and are represented as E and F in this order in the positive X-axis direction. In addition, in the Comparative Example as well, the parts of the waveguide 920 where the non-reciprocal member 941 is not positioned are referred to as first parts 921. The part where the non-reciprocal member 941 is positioned is referred to as a second part 922. The boundaries between the first parts 921 and the second part 922 correspond to the positions of the end portions, in the X-axis direction, of the non-reciprocal member 941, and are represented as E and F in this order in the positive X-axis direction.

In the optical integrated circuit 100 according to this Example, the side surfaces 133 and 134 of the recess 130 intersect the side surface 131 at an angle of less than 90 degrees. As a result, the Y-axis direction dimension of the non-reciprocal member 141 gradually increases in size as one moves from E to G in the positive X-axis direction, or as one moves from F to H in the negative X-axis direction. The dimension of the non-reciprocal member 141 in the Y-axis direction is constant in the range between G and H.

As described above, loss occurs when electromagnetic waves propagate due to the mode center being shifted in the amplitude direction of the TE-mode electromagnetic waves, i.e., the Y-axis direction, between the part where the non-reciprocal member is positioned and the parts where the non-reciprocal member is not positioned. On the other hand, the smaller the shift of the mode center, the lower the loss when electromagnetic waves propagate through the parts where the mode center is shifted.

In addition, when the mode center at each position in the direction in which the TE-mode electromagnetic waves propagate, i.e., the X-axis direction, gradually moves in the Y-axis direction from the first part 121 to the second part 122 of the waveguide 120, the loss of the TE-mode electromagnetic waves is reduced compared to when the mode center moves in the Y-axis direction in a step-like manner. In other words, the smaller the amount of movement of the mode center in the Y-axis direction when TE-mode electromagnetic waves propagate for a unit length in the X-axis direction, the greater the degree to which the loss of the TE-mode electromagnetic waves is reduced.

In the optical integrated circuit 900 according to the Comparative Example, the non-reciprocal member 941 has a rectangular shape in plan view of the substrate 950, and therefore the dimension of the non-reciprocal member 941 in the Y-axis direction changes in a step-like manner at positions E and F. As a result, the mode center of the second part 922 in the Y-axis direction moves in a step-like manner in the negative Y-axis direction relative to the mode centers of the first parts 921 in the Y-axis direction.

On the other hand, in the optical integrated circuit 100 according to this Example, the dimension of the non-reciprocal member 141 in the Y-axis direction gradually changes between E and G or between H and F. As a result, the mode center of the second part 122 in the Y-axis direction gradually moves in the negative Y-axis direction from the mode centers of the first part 121 in the Y-axis direction while advancing from E to G or from H to F.

In other words, the shift of the mode center in the Y-axis direction when TE-mode electromagnetic waves propagate for a unit length from the first parts 121 to the second part 122 in the optical integrated circuit 100 according to this Example is smaller than the shift of the mode center in the Y-axis direction when TE-mode electromagnetic waves propagate for a unit length from the first parts 921 to the second part 922 in the optical integrated circuit 900 according to the Comparative Example. As a result, the loss that occurs when the TE-mode electromagnetic waves propagate between the first parts 121 and the second part 122 in the optical integrated circuit 100 according to this Example is less than the loss that occurs in the optical integrated circuit 900 according to the Comparative Example.

The optical integrated circuit 100 according to this Example may be configured so that the amount of movement of the mode center in the Y-axis direction when TE-mode electromagnetic waves propagate for a unit length in the X-axis direction is less than a prescribed threshold. The prescribed threshold may be set in accordance with the allowable value of loss that occurs when TE-mode electromagnetic waves propagate.

Figure 10:
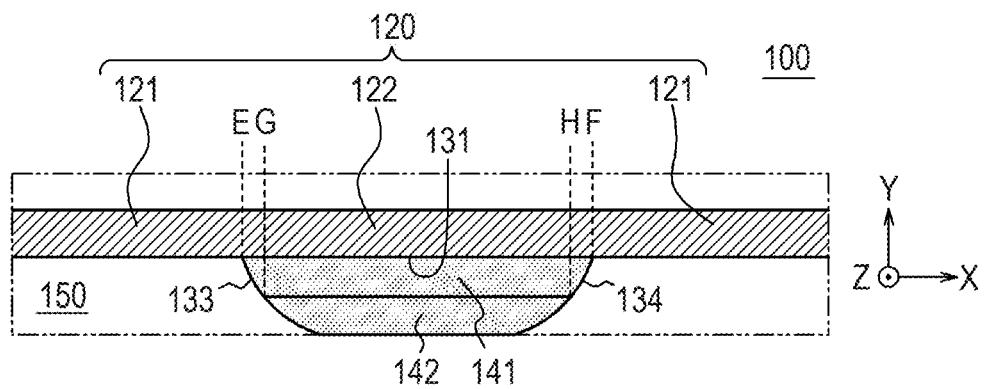
FIG. 10 is a diagram illustrating an example configuration in which end portions of a non-reciprocal member in the configuration in FIG. 9B are curved.

As illustrated in FIG. 10, the recess 130 may be configured so that the side surface 133 or 134 positioned at an end portion of the recess 130 in the X-axis direction is a convex curved surface in a direction away from the waveguide 120. The side surface 133 or 134 may be configured to be perpendicular to the side surface 131 at the position where the side surface 133 or 134 intersects the side surface 131. The larger the angle at which the side surface 133 or 134 intersects the side surface 131, the greater the likelihood that the non-reciprocal member 141 will be deposited at the position where the side surface 133 or 134 intersects the side surface 131. In FIG. 10, the end portions of the non-reciprocal member 141 in the X-axis direction, i.e., the boundaries between the first parts 121 and the second part 122, are represented by E and F. In addition, the end portions of the range in which the dimension of the non-reciprocal member 141 in the Y-axis direction is constant are represented by G and H.

Figure 11:
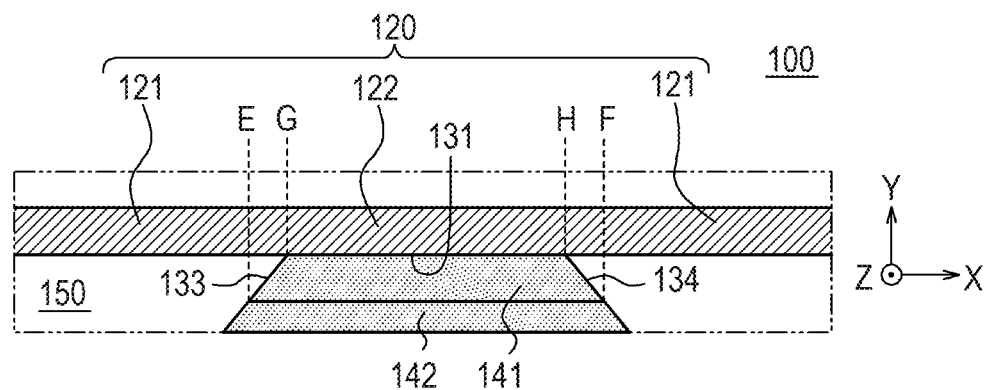
FIG. 11 is a diagram illustrating an example configuration in which an internal angle of a recess on a waveguide side is obtuse.

As illustrated in FIG. 11, the recess 130 may be configured so that the angle at which the side surface 133 or 134 intersects the side surface 131 is obtuse. In other words, the internal angles of the recess 130 on the side near the waveguide 120 may be obtuse angles. The non-reciprocal member 141 is easier to deposit at the position where the side surface 133 or 134 and the side surface 131 intersect each other as a result of the angle at which the side surface 133 or 134 and the side surface 131 intersect each other being obtuse. In FIG. 11, the end portions of the non-reciprocal member 141 in the X-axis direction, i.e., the boundaries between the first parts 121 and the second part 122, are represented by E and F. In addition, the end portions of the range in which the dimension of the non-reciprocal member 141 in the Y-axis direction is constant are represented by G and H. G and H correspond to the positions where the non-reciprocal member 141 begins to separate away from the waveguide 120. The non-reciprocal member 141 generates non-reciprocity by being positioned within the range of the MFD in the Y-axis direction of the TE-mode electromagnetic waves propagating in the waveguide 120, in the section from E to G or the section from F to H, which is distant from the waveguide 120.

Figure 12:
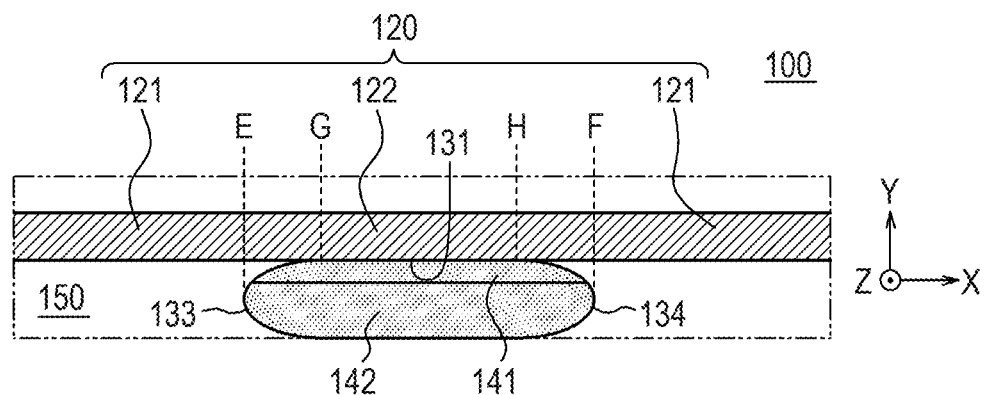
FIG. 12 is a diagram illustrating an example configuration in which end portions of a non-reciprocal member in the configuration in FIG. 11 are curved.

As illustrated in FIG. 12, the recess 130 may be configured such that the side surface 133 or 134 is smoothly connected to the side surface 131 in plan view of the substrate 150. The non-reciprocal member 141 is easier to deposit at the position where the side surface 133 or 134 and the side surface 131 intersect each other when the side surface 133 or 134 is smoothly connected to the side surface 131. In addition, the side surface 133 or 134 may be a convex curved surface on the outer side of the recess 130. In FIG. 12, the end portions of the non-reciprocal member 141 in the X-axis direction, i.e., the boundaries between the first parts 121 and the second part 122, are represented by E and F. In addition, the end portions of the range in which the dimension of the non-reciprocal member 141 in the Y-axis direction is constant are represented by G and H. G and H correspond to the positions where the non-reciprocal member 141 begins to separate away from the waveguide 120. The non-reciprocal member 141 generates non-reciprocity by being positioned within the range of the MFD in the Y-axis direction of the TE-mode electromagnetic waves propagating in the waveguide 120, in the section from E to G or the section from F to H, which is distant from the waveguide 120.

In FIGS. 10, 11, and 12, the dimension of the non-reciprocal member 141 in the Y-axis direction gradually changes between E and G or between H and F. In a section where the dimension of the non-reciprocal member 141 in the Y-axis direction gradually changes, the mode center of the second part 122 in the Y-axis direction gradually moves in the negative Y-axis direction from the mode center of the first part 121 in the Y-axis direction. As a result, the loss that occurs when the TE-mode electromagnetic waves propagate between the first part 121 and the second part 122 is less than the loss that occurs in the optical integrated circuit 900 according to the Comparative Example.

Figure 13:
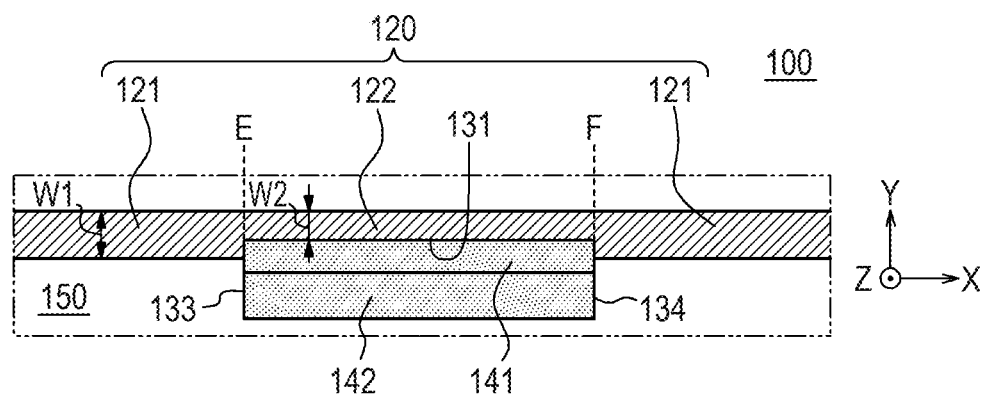
FIG. 13 is a diagram illustrating an example configuration in which a non-reciprocal member is inserted into a waveguide.

As illustrated in FIG. 13, the waveguide 120 may be configured such that the end, in the negative Y-axis direction, of the second part 122 between E and F, which corresponds to an end portion of the non-reciprocal member 141 in the X-axis direction, is positioned in the positive Y-axis direction relative to the ends of the first parts 121 in the negative Y-axis direction. The waveguide 120 may be configured such that the non-reciprocal member 141 enters the inside of the waveguide 120 in the second part 122. In this case, the dimension of the second part 122 in the Y-axis direction is smaller than the dimension of the first parts 121 in the Y-axis direction. The center of the second part 122 in the Y-axis direction is moved in the positive Y-axis direction relative to the centers of the first parts 121 in the Y-axis direction.

Here, the dimension of the first parts 121 in the Y-axis direction is expressed as W1. The dimension of the second parts 122 in the Y-axis direction is expressed as W2. W2 is shorter than W1. The distance moved by the center of the second part 122 in the Y-axis direction relative to the centers of the first parts 121 in the Y-axis direction is expressed as (W1−W2)/2. If we assume that there is no non-reciprocal member 141, the mode center, in the Y-axis direction, of the TE-mode electromagnetic waves propagating in the second part 122 is moved in the positive Y-axis direction by (W1−W2)/2 relative to the mode centers in the first parts 121.

The non-reciprocal member 141 acts to shift the mode center of the TE-mode electromagnetic waves propagating in the second part 122 in the negative Y-axis direction as a result of being positioned along the second part 122. The direction of movement of the mode center caused by the action of the non-reciprocal member 141 is opposite to the direction of movement of the center of the second part 122 in the Y-axis direction. Therefore, the movement of the mode center caused by the action of the non-reciprocal member 141 is canceled out by the movement of the center of the second part 122 in the Y-axis direction. As a result, the shift of the mode centers in the first parts 121 relative to the mode center in the second part 122 is reduced. The shift between the mode centers in the first parts 121 and the mode center in the second part 122 is reduced, and as a result, the loss when electromagnetic waves propagate from the first part 21 to the second part 22 of the waveguide 20 or the loss when electromagnetic waves propagate from the second part 22 to the first part 21 of the waveguide 20 is reduced.

The dimension of the non-reciprocal member 141 in the Y-axis direction and the dimension of the second part 122 between E and F may be configured so that the shift between the mode centers in the first parts 121 and the mode center in the second part 122 falls within a prescribed range.

Figure 14:
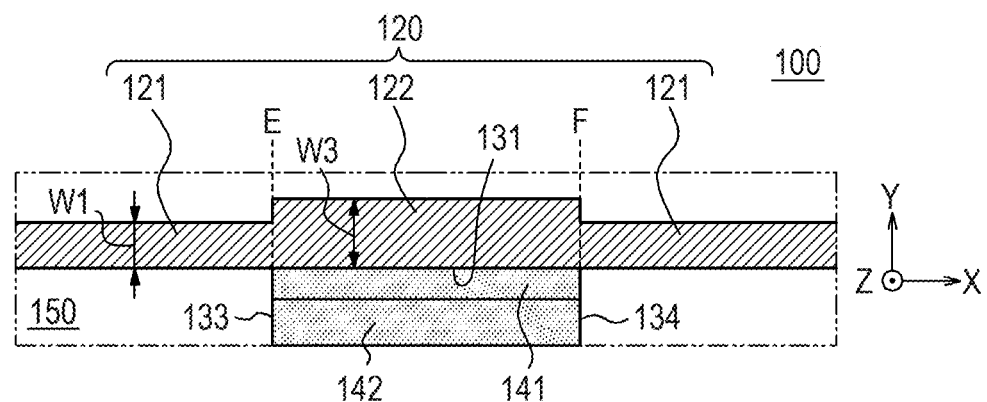
FIG. 14 is a diagram illustrating an example configuration in which the second part protrudes on the opposite side from the non-reciprocal member.

As illustrated in FIG. 14, the waveguide 120 may be configured such that the end, in the positive Y-axis direction, of the second part 122 between E and F, which corresponds to an end portion of the non-reciprocal member 141 in the X-axis direction, is positioned in the positive Y-axis direction relative to the end of the first part 121 in the positive Y-axis direction. The waveguide 120 may be configured such that the second parts 122 project in the positive Y-axis direction, i.e., away from the non-reciprocal member 141. In this case, the dimension of the second parts 122 in the Y-axis direction is larger than the dimension of the first part 121 in the Y-axis direction. The center of the second part 122 in the Y-axis direction is moved in the positive Y-axis direction relative to the centers of the first parts 121 in the Y-axis direction.

Here, the dimension of the first parts 121 in the Y-axis direction is expressed as W1. The dimension of the second part 122 in the Y-axis direction is expressed as W3. W3 is longer than W1. The distance moved by the center of the second part 122 in the Y-axis direction relative to the center of the first part 121 in the Y-axis direction is expressed as (W3−W1)/2. If we assume that there is no non-reciprocal member 141, the mode center, in the Y-axis direction, of the TE-mode electromagnetic waves propagating in the second part 122 is moved in the positive Y-axis direction by (W3−W1)/2 relative to the mode center in the first part 121.

The non-reciprocal member 141 acts to shift the mode center of the TE-mode electromagnetic waves propagating in the second part 122 in the negative Y-axis direction as a result of being positioned along the second part 122. The direction of movement of the mode center caused by the action of the non-reciprocal member 141 is opposite to the direction of movement of the center of the second part 122 in the Y-axis direction. Therefore, the movement of the mode center caused by the action of the non-reciprocal member 141 is canceled out by the movement of the center of the second part 122 in the Y-axis direction. As a result, the shift of the mode centers in the first parts 121 relative to the mode center in the second part 122 is reduced. The shift between the mode centers in the first parts 121 and the mode center in the second part 122 is reduced, and as a result, the loss when electromagnetic waves propagate from the first part 21 to the second part 22 of the waveguide 20 or the loss when electromagnetic waves propagate from the second part 22 to the first part 21 of the waveguide 20 is reduced.

The dimension of the non-reciprocal member 141 in the Y-axis direction and the dimension of the second part 122 between E and F may be configured so that the shift between the mode centers in the first parts 121 and the mode center in the second part 122 falls within a prescribed range.

Figure 15:
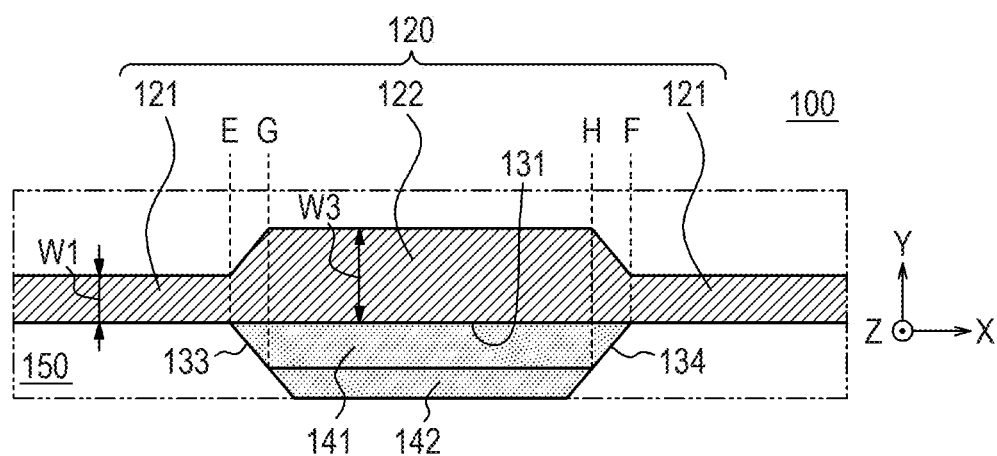
FIG. 15 is a diagram illustrating an example configuration in which the end portions of the second part and the non-reciprocal member in FIG. 14 are inclined.

As illustrated in FIG. 15, the optical integrated circuit 100 may be configured such that both the non-reciprocal member 141 and the second part 122 of the waveguide 120 gradually increase in thickness from E to G. In addition, the optical integrated circuit 100 may be configured such that both the non-reciprocal member 141 and the second part 122 of the waveguide 120 gradually increase in thickness from F to H. In other words, compared to the optical integrated circuit 100 in FIG. 14, in the optical integrated circuit 100 in FIG. 15, the end portions of the non-reciprocal member 141 and the second part 122 of the waveguide 120 are inclined in plan view of the substrate 150. The dimension of the non-reciprocal member 141 in the Y-axis direction and the dimension of the second part 122 between G and H may be configured so that the shift between the mode center in the first part 121 and the mode center in the second part 122 falls within a prescribed range.

The shift of the mode center at E or F when a misalignment occurs in the X-axis direction between the non-reciprocal member 141 and the second part 122 of the waveguide 120 is reduced by the gradual change in the Y-axis direction dimension of the non-reciprocal member 141 and the second part 122 of the waveguide 120 from E to G or from F to H.

The optical integrated circuit 100 may be configured so that the amount of change in the Y-axis direction dimension of the non-reciprocal member 141 and the amount of change in the Y-axis-direction dimension of the second part 122 at each position in the X-axis direction are proportional in each of the section from E to G and the section from F to H. In this way, the shift in the mode center is further reduced.

As described above, by making TE-mode electromagnetic waves propagate using the optical integrated circuit 100 according to this Example, the loss when electromagnetic waves propagate from the first parts 121 of the waveguide 120, where the non-reciprocal member 141 is not positioned, to the second part 122 of the waveguide 120, where the non-reciprocal member 141 is positioned, or the loss when electromagnetic waves propagate from the second part 122 to the first parts 121 is reduced.

(Example Application of Optical Integrated Circuit 1)

The optical integrated circuit 1 may include an element that functions as an isolator. The isolator may include at least one non-reciprocal line. The isolator may include the waveguide 20, which includes the second part 22 that exhibits non-reciprocity, as the non-reciprocal line. The isolator may include a reciprocal line that does not exhibit non-reciprocity. The isolator may be used in combination with a configuration that transmits electromagnetic waves. The isolator may be applied to an optical switch, an optical transceiver, or a data center. The isolator may be, for example, applied to an electromagnetic wave transmitter. The electromagnetic wave transmitter includes an isolator and a light source. The electromagnetic wave transmitter inputs electromagnetic waves from the light source to the isolator, and outputs electromagnetic waves from the isolator to a receiver. The isolator is configured so that the transmittance of electromagnetic waves propagating from the light source to the receiver is greater than the transmittance of electromagnetic wave propagating from the receiver to the light source. In this way, electromagnetic waves are less likely to enter the light source. As a result, the light source can be protected.

The light source may be a semiconductor laser, such as an LD (laser diode) or VCSEL (vertical cavity surface emitting laser), for example. The light source may include a device that emits electromagnetic waves of various wavelengths, not limited to visible light. The light source may be formed together with the isolator on the substrate 50. The light source may input TE-mode or TM-mode electromagnetic waves into the isolator.

The electromagnetic wave transmitter may also include a modulator and signal input unit. A modulator modulates electromagnetic waves by changing the intensity of the electromagnetic waves. The modulator may be positioned between the isolator and the receiver, rather than between the light source and the isolator. The modulator may, for example, pulse-modulate electromagnetic waves. The signal input unit accepts signals from external devices, etc. The signal input unit may include a D/A converter, for example. The signal input unit outputs signals to the modulator. The modulator modulates the electromagnetic waves based on a signal acquired at the signal input unit.

The light source may include a modulator and a signal input unit. In this case, the light source may output modulated electromagnetic waves and input the modulated electromagnetic waves into the isolator.

The electromagnetic wave transmitter may be mounted on the substrate 50. The light source may be implemented so as to be connected to a branching portion that branches and inputs electromagnetic waves into at least one non-reciprocal line via a modulator. The light source may be implemented so as to be connected to the branching portion without a modulator therebetween. The receiver may be implemented so as to be connected to a multiplexing portion that combines electromagnetic waves input from at least one non-reciprocal line without a modulator therebetween. The receiver may be implemented so as to be connected to a multiplexing portion via a modulator. In this case, the modulator may be implemented so as to be connected to the multiplexing portion.

The optical integrated circuit 1 may be formed using silicon photonics technologies.

Although embodiments of the present disclosure have been described based on the drawings and examples, please note that one skilled in the art can make various variations or changes based on the present disclosure. Please note that, therefore, these variations or changes are included within the scope of the present disclosure. For example, the functions included in each component can be rearranged in a logically consistent manner, and a plurality of components can be combined into a single component or a single component can be divided into a plurality of components.

In the present disclosure, "first", "second", and so on are identifiers used to distinguish between such configurations. Regarding the configurations, "first", "second", and so on used to distinguish between the configurations in the present disclosure may be exchanged with each other. For example, identifiers "first" and "second" may be exchanged between the first part 21 and the second part 22. Exchanging of the identifiers take places simultaneously. Even after exchanging the identifiers, the configurations are distinguishable from each other. The identifiers may be deleted. The configurations that have had their identifiers deleted are distinguishable from each other by symbols. Just the use of identifiers such as "first" and "second" in this disclosure is not to be used as a basis for interpreting the order of such configurations or the existence of identifiers with smaller numbers.

In the present disclosure, the X-axis, the Y-axis, and the Z-axis are provided for the sake of explanation and may be interchanged with each other. The configuration of the present disclosure has been explained using a Cartesian coordinate system composed of the X-axis, the Y-axis, and the Z-axis. The positions of the configurations in the present disclosure are not limited to being in a Cartesian relationship.

In an embodiment, (1) an optical integrated circuit includes: a waveguide including a first part and a second part and configured to couple an electromagnetic wave propagating in the first part and an electromagnetic wave propagating in the second part; and a non-reciprocal member positioned alongside the second part in an amplitude direction of an electric field component of the electromagnetic wave. In a range where the first part and the second part are coupled with each other, deviation between a center of an energy distribution of an electric field component of the electromagnetic wave propagating in the first part and a center of an energy distribution of an electric field component of the electromagnetic wave propagating in the second part falls within a prescribed range.

(2) In the optical integrated circuit according to (1), a center of the second part in the amplitude direction of the electric field component of the electromagnetic wave may be shifted in a direction away from the non-reciprocal member relative to a center of the first part in the amplitude direction of the electric field component of the electromagnetic wave.

(3) In the optical integrated circuit according to (1) or (2), in the range where the first part and the second part are coupled with each other, a dimension of the second part in the amplitude direction of the electric field component of the electromagnetic wave may be smaller than a dimension of the first part in the amplitude direction of the electric field component of the electromagnetic wave.

(4) In the optical integrated circuit according to (3), the second part may increase in size in a direction toward the non-reciprocal member with increasing distance from the first part.

(5) In the optical integrated circuit according to (4), the first part and the second part may be positioned spaced apart from each other in a propagation direction of the electromagnetic wave.

(6) In the optical integrated circuit according to any one of (2) to (5), the non-reciprocal member may increase in size in the amplitude direction of the electric field component of the electromagnetic wave with increasing distance from the first part.

(7) In the optical integrated circuit according to (6), the second part may decrease in size in a direction away from the non-reciprocal member with increasing distance from the first part.

(8) The optical integrated circuit according to any one of (1) to (7) may further include a substrate having a substrate surface and an insulating layer positioned on the substrate surface. The waveguide may extend along the substrate surface. The insulating layer may be positioned with the insulating layer surrounding the waveguide and include a recess formed above the second part. The non-reciprocal member may be positioned on a bottom surface of the recess.

(9) In the optical integrated circuit according to (8), the recess may be formed with the second part contacting the non-reciprocal member at the bottom surface of the recess.

(10) In the optical integrated circuit according to (8) or (9), the recess may be formed with the insulating layer positioned between the waveguide and the non-reciprocal member at the bottom surface of the recess.

(11) The optical integrated circuit according to any one of (1) to (7) may further include a substrate having a substrate surface and an insulating layer positioned on the substrate surface. The waveguide may extend along the substrate surface. The insulating layer may be positioned with the insulating layer surrounding the waveguide and include a recess formed along the second part. The non-reciprocal member may be positioned at a side surface of the recess, the side surface extending along the second part.

(12) In the optical integrated circuit according to any one of (1) to (11), the optical integrated circuit may be formed using silicon photonics technologies.

REFERENCE SIGNS 1 optical integrated circuit
20 waveguide (21: first part, 22: second part, 23: sloping part)
30 recess (31: side surface, 32: bottom surface)
40 non-reciprocal member
50 substrate (50A: substrate surface, 52: box layer, 54, 56, 58: insulating layer)
100 optical integrated circuit
120 waveguide (121: first part, 122: second part)
130 recess (131: first side surface, 132: bottom surface, 133: second side surface, 134: third side surface, 135: fourth side surface)
141, 142 non-reciprocal member
150 substrate (150A: substrate surface, 152: box layer, 154: insulating layer)

The invention claimed is:

1. An optical integrated circuit comprising:
a waveguide including a first part and a second part and configured to couple an electromagnetic wave propagating in the first part and an electromagnetic wave propagating in the second part with each other; and
a non-reciprocal member positioned alongside the second part in an amplitude direction of an electric field component of the electromagnetic wave,
wherein in the range where the first part and the second part are coupled with each other, a dimension of the second part in the amplitude direction of the electric field component of the electromagnetic wave is smaller than a dimension of the first part in the amplitude direction of the electric field component of the electromagnetic wave,
wherein the second part increases in size in a direction toward the non-reciprocal member with increasing distance from the first part, and
wherein the non-reciprocal member is positioned only above a top surface of the waveguide.

2. The optical integrated circuit according to claim 1, wherein a center of the second part in the amplitude direction of the electric field component of the electromagnetic wave is shifted in a direction away from the non-reciprocal member relative to a center of the first part in the amplitude direction of the electric field component of the electromagnetic wave.

3. The optical integrated circuit according to claim 1, wherein the first part and the second part are positioned spaced apart from each other in a propagation direction of the electromagnetic wave.

4. An optical integrated circuit comprising:
   a waveguide including a first part and a second part and configured to couple an electromagnetic wave propagating in the first part and an electromagnetic wave propagating in the second part with each other; and
   a non-reciprocal member positioned alongside the second part in an amplitude direction of an electric field component of the electromagnetic wave,
   wherein a center of the second part in the amplitude direction of the electric field component of the electromagnetic wave is shifted in a direction away from the non-reciprocal member relative to a center of the first part in the amplitude direction of the electric field component of the electromagnetic wave,
   wherein the non-reciprocal member increases in size in the amplitude direction of the electric field component of the electromagnetic wave with increasing distance from the first part, and
   wherein the non-reciprocal member is positioned only above a top surface of the waveguide.

5. The optical integrated circuit according to claim 4, wherein the second part decreases in size in a direction away from the non-reciprocal member with increasing distance from the first part.

6. The optical integrated circuit according to claim 1, further comprising:
   a substrate having a substrate surface; and
   an insulating layer positioned on the substrate surface,
      wherein the waveguide extends along the substrate surface,
      the insulating layer is positioned with the insulating layer surrounding the waveguide and includes a recess formed above the second part, and
      the non-reciprocal member is positioned on a bottom surface of the recess.

7. The optical integrated circuit according to claim 6, wherein the recess is formed with the second part contacting the non-reciprocal member at the bottom surface of the recess.

8. The optical integrated circuit according to claim 6, wherein the recess is formed with the insulating layer positioned between the waveguide and the non-reciprocal member at the bottom surface of the recess.

9. The optical integrated circuit according to claim 1, further comprising: a substrate having a substrate surface; and
   an insulating layer positioned on the substrate surface,
      wherein the waveguide extends along the substrate surface,
      the insulating layer is positioned with the insulating layer surrounding the waveguide and includes a recess formed along the second part, and
      the non-reciprocal member is positioned on a side surface of the recess, the side surface extending along the second part.

10. The optical integrated circuit according to claim 1, wherein the optical integrated circuit is formed using silicon photonics technologies.

* * * * *